United States Patent [19]

Citta et al.

[11] Patent Number: 5,086,340
[45] Date of Patent: Feb. 4, 1992

[54] CO-CHANNEL INTERFERENCE REDUCTION SYSTEM FOR DIGITAL HIGH DEFINITION TELEVISION

[75] Inventors: Richard W. Citta, Oak Park; Carl G. Eilers, River Forest, both of Ill.

[73] Assignee: Zenith Electronics Corporation, Glenview, Ill.

[21] Appl. No.: 601,169

[22] Filed: Oct. 19, 1990

[51] Int. Cl.⁵ .............................................. H04N 7/13
[52] U.S. Cl. .................................... 358/141; 358/135; 375/103
[58] Field of Search ............... 358/186, 188, 197, 167, 358/141, 12, 83, 31; 455/295, 296, 210, 307, 308, 63; 375/18, 101, 103, 17, 19

[56] References Cited

U.S. PATENT DOCUMENTS

| | | | |
|---|---|---|---|
| 4,032,847 | 6/1977 | Unkauf | 375/101 |
| 4,216,496 | 8/1980 | Lothian et al. | 358/83 |
| 4,343,019 | 8/1982 | Lagoni | 358/31 |
| 4,503,545 | 3/1985 | Bremer et al. | 375/101 |
| 4,609,907 | 9/1986 | Adler et al. | 375/18 |
| 4,635,104 | 1/1987 | Hausdörfer | 358/31 |
| 4,730,343 | 3/1988 | Kanemasa et al. | 375/103 |
| 4,890,283 | 12/1989 | Tsinberg et al. | 358/135 |
| 4,947,243 | 8/1990 | Wendland et al. | 358/31 |
| 4,953,183 | 8/1990 | Bergmanns et al. | 375/101 |
| 5,003,555 | 3/1991 | Bergmans | 375/103 |

OTHER PUBLICATIONS

Digital Communications: Microwave Applications, Feher, Copr. 1981 by Prentice Hall, Inc., pp. 144-163.

*Primary Examiner*—James J. Groody
*Assistant Examiner*—Jeffrey S. Murrell

[57] ABSTRACT

A co-channel interference reduction system for digital high definition television includes a transmitter having a modulo 4 processing precode filter. A receiver includes a pair of selectable video processing modes. The first mode provides a comb filter for removing co-channel interference signals together with a modulo 4 interpreter for restoring the four level data signal despite the intersymbol interference signal introduced by the comb filter segment. In the alternate mode operable in the absence of co-channel interfering signals, a level slicer and postcoder are used to restore the precoded signal to the original four level data signal.

32 Claims, 3 Drawing Sheets

CO-CHANNEL INTERFERENCE REDUCTION SYSTEM FOR DIGITAL HIGH DEFINITION TELEVISION

CROSS REFERENCE TO RELATED PATENT APPLICATION

This application is related to a copending application filed Oct. 19, 1990 having Ser. No. 600,469 and entitled CO-CHANNEL INTERFERENCE FILTER FOR DIGITAL HIGH DEFINITION TELEVISION RECEIVER which is assigned to the assignee of the present application.

FIELD OF THE INVENTION

This invention relates generally to high definition television receivers and particularly to those receiving digitally encoded high definition television signals.

BACKGROUND OF THE INVENTION

The standard NTSC color television broadcast system adopted in the United States by the Federal Communications Commission provides a six megahertz bandwidth for each television broadcast channel. Within this six megahertz bandwidth, broadcasters must provide video, color and sound information together with several synchronizing signals. The latter are required to enable the television receiver to properly display the picture information as originally modulated at the transmitter.

The use of conventional information processing by television broadcast and receiving systems involves the modulation of analog information signals upon one or more carrier signals for broadcast. This analog signal processing together with the limited bandwidth available for each television broadcast channel limits the maximum frequency response of picture information which may be transmitted and received. This limited frequency response results in a limitation of the resolution or picture definition of the displayed television picture. Within these constraints, manufacturers of television receivers have adopted a variety of picture information processing and display techniques to enhance the perceived definition or resolution of the displayed television picture.

While the effort by television manufacturers to provide such enhanced resolution has provided considerable improvement, there exists a continuing desire to further improve television picture quality. This continuing desire has motivated practitioners in the television arts to undertake the development of a variety of high definition television systems. One of the fundamentals applied to such high definition television system development is the need to process higher frequency picture information. One possible solution involves expanding the available bandwidth of the television broadcast channels. While such a system is technologically direct, its implementation is considered impractical given the proliferation of standard NTSC signal stations and television receivers. Another possible approach involves compressing a wideband video signal while maintaining the present six megahertz broadcast channel bandwidth. In this regard, transmission of the compressed signal in digital form is generally preferred since improved noise performance is provided relative to conventional analog transmission. That is, any noise picked up in the digital transmission of the encoded signals will not be reproduced if the discrete levels of the digital transmission can be accurately resolved in the receiver. However, in digital transmission, excessive noise or interference can result in total loss of picture if the digital levels cannot be resolved, in contrast to analog where the picture is gradually degraded.

While the structures of high definition television systems may vary, a typical wideband system uses a high frequency analog video source having a bandwidth in excess of thirty megahertz for picture information. The broad bandwidth video information is converted from analog to digital information by conventional analog to digital conversion. Thereafter, digital signal processing techniques are utilized to perform one or more data compression operations to provide a signal capable of being digitally transmitted within the available six megahertz bandwidth. This digitally encoded signal is used to modulate an assigned television broadcast carrier.

At the receiver, a generally conventional tuner, intermediate frequency amplifier, and picture detector recover the digitally encoded signal in much the same manner as a conventional NTSC receiver. Thereafter, decompression systems produce a representation of the original compressed signal afterwhich a digital to analog converter converts the digitally encoded signal to a wideband analog picture information signal. This analog signal is then processed for display upon a high resolution television display such as a cathode ray tube.

Such high definition television systems will, of course, be incompatible with standard NTSC systems. Because of the great number of NTSC television receivers presently installed and in use, it is likely that the implementation of such high definition television systems will be carried forward in a manner which avoids disturbing FCC allocation of existing NTSC services. One of the most likely approaches to making high definition television available involves assigning presently unused television broadcast channels to high definition television broadcasting. Through the years, the Federal Communications Commission has endeavored to avoid assigning the same television broadcast channels to broadcasters operating in potentially overlapping television service areas. As a result, most areas in the United States have a number of unused television channels available. However, the assignment of such channels to high definition television broadcasters will increase the likelihood of closely spaced or overlapping broadcast areas. In such areas, television receivers may be subjected to two different television broadcast signals on the same broadcast channel. The result of simultaneous reception of two different signals within the same broadcast channel produces an interference problem within the receiver known as co-channel interference. High definition television receivers receiving digitally transmitted signals may be subject to stronger interference signals than receivers receiving NTSC signals and as a result such co-channel interference signals are likely to severely degrade or even disrupt the operation of the high definition television receivers.

Since the channel selection tuning mechanisms used in television receivers provide channel selection based upon signal frequency, even the best tuner may not exclude an undesired co-channel signal. There arises, therefore, a need in the art for an effective means for reducing co-channel interference, especially in digital high definition television system receivers.

Accordingly, it is a general object of the present invention to provide an improved high definition television system. It is a more particular object of the present invention to provide an improved high definition television system capable of reducing the effects of co-channel interference without significantly degrading the performance of the receiver.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENTS

Figure 1:
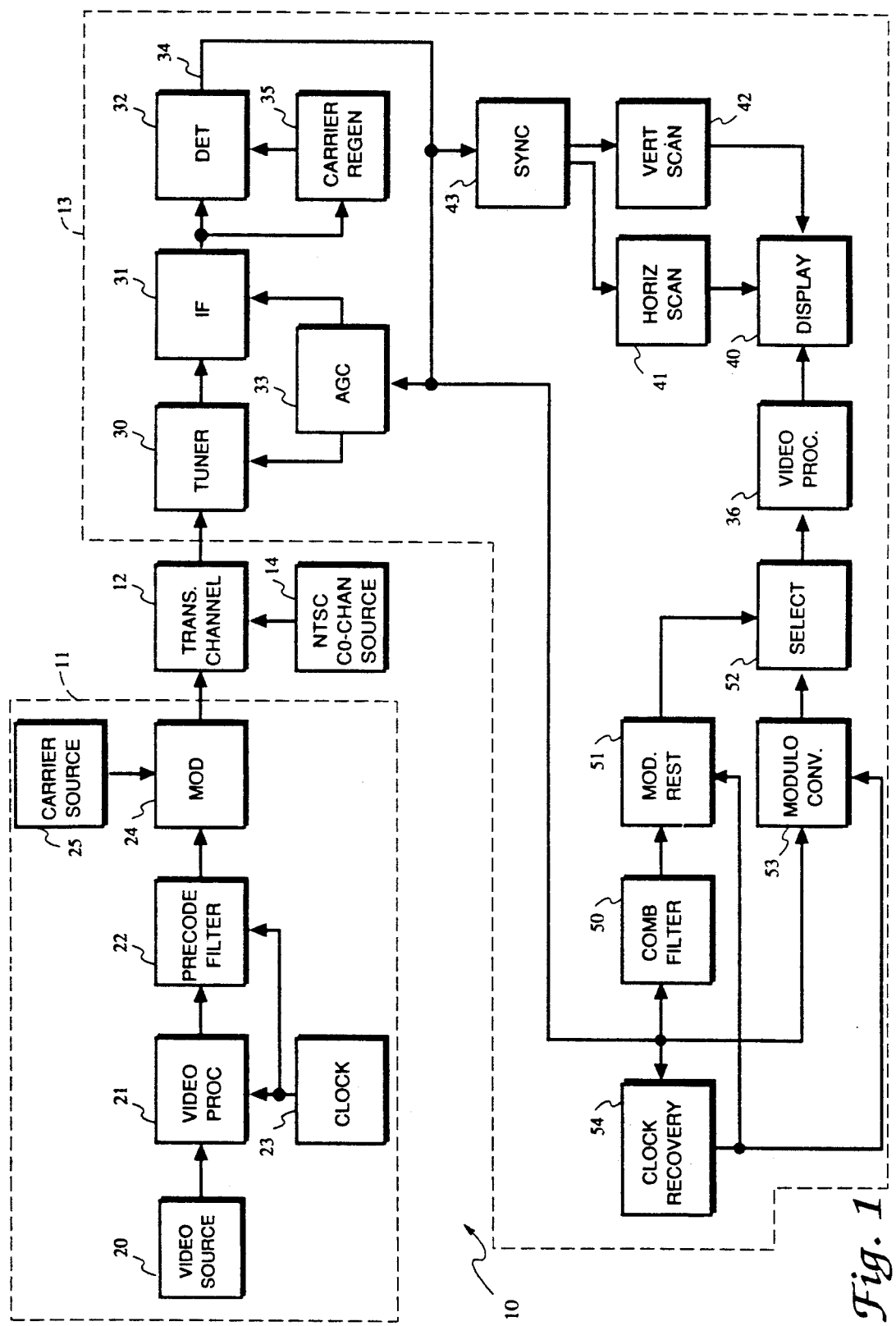
FIG. 1 sets forth a block diagram of a digital high definition television system constructed in accordance with the present invention.

FIG. 1 sets forth a block diagram of a co-channel interference reduction system constructed in accordance with the present invention and generally referenced by numeral 10. System 10 includes a transmitter portion 11 and a receiver portion 13 coupled in a signal transmitting and receiving arrangement via a transmission channel 12. Transmission channel 12 may, for example, be a conventional over-the-air broadcast channel, a channel on a cable system, or other delivery means. Also shown in FIG. 1 is a source of NTSC co-channel interference 14. It will be apparent that interference source 14 is not, in essence, a portion of the present invention but rather represents a source of NTSC signal at the same channel as receiver 13 is configured to receive. Thus, when a co-channel source such as source 14 is present, receiver 13 may receive simultaneous signals from transmitter 11 via transmission channel 12 as well as an undesired co-channel signal from NTSC source 14 giving rise to the above-described problem of co-channel interference.

Transmitter 11 includes a video source 20 having a source of wideband video information having a bandwidth approaching thirty seven megahertz for each of the red, green and blue camera signals which is coupled to a video processor 21. Although not necessarily limited thereto, video source 20 provides a 787.5 line progressively scanned video signal having a vertical periodicity (Fv) and a horizontal periodicity (Fh). A precode filter 22, the structure of which is set forth below in greater detail, couples the output the video processor 21 to a broadcast modulator 24. Modulator 24 includes a source of carrier signal 25 and is operative to modulate the carrier produced by carrier source 25 with the output of precode filter 22 and to couple the modulated signal to transmission channel 12. A clock signal source 23 produces a precise periodic clock signal and is coupled to video processor 21 and precode filter 22. For reasons set forth below in greater detail, the frequency of clock 23 is preferably maintained at a multiple of the selected NTSC periodicity of comb filter 50 within receiver 13.

Receiver 13 includes a tuner 30 coupled to transmitter 11 via transmission channel 12. Receiver 13 further includes a generally conventional intermediate frequency amplifier 31, a carrier regenerator 35 and detector 32, which may comprise a synchronous detector. The synchronous detector is supplied with a regenerated carrier from carrier regenerator 35 which may be derived by locking to the received video data or in response to a transmitted pilot signal. A sample of the output signal of detector 32 at output 34 is coupled to an automatic gain control system 33 which is further coupled to tuner 30 and intermediate frequency amplifier 31. Tuner 30, intermediate frequency amplifier 31, detector 32 and automatic gain control system 33 cooperate in accordance with general television receiver fabrication techniques to produce a detected video signal at output 34.

A high resolution display system 40 which may, for example, comprise a high resolution cathode ray tube is coupled to a horizontal scan system 41 and a vertical scan system 42. Horizontal scan 41 and vertical scan 42 cooperate to provide a scanned display raster upon display 40 preferably 787.5 progressively scanned having a vertical scan frequency equal to the NTSC vertical frequency and a horizontal scan frequency three times that of an NTSC signal. A display synchronizing system 43 is coupled to detector output 34 and produces horizontal and vertical scan synchronizing signals which are coupled to scan systems 41 and 42 to properly time the scanning of display 40.

Detector output 34 is further coupled to a comb filter 50 and to a modulo decoder 53. The output of comb filter 50 is coupled to a modulo restorer 51 having an output coupled to a switch 52. The output of modulo decoder 53 is also coupled to switch 52 which is operative to selectively couple either modulo restorer 51 or modulo decoder 53 to display 40. A clock recovery system 54 is coupled to detector output 34 and produces a clock signal corresponding to clock 23 in transmitter 11. The output clock signal of clock recovery system 54 is coupled to modulo restorer 51 and modulo decoder 53.

In operation, video source 20 within transmitter 11 produces the to-be-transmitted video information which is coupled to one input of video processor 21. Video processor 21 responds to the input video signal together with clock signals from clock 23 to convert the input video signal to a corresponding stream of four level digital data. Video processor 21 also adds a clock reference signal to the four level data signal which facilitates the establishment of a corresponding clock signal within receiver 13. It will be apparent to those skilled in the art that other multi-level digital data systems can be used in video processor 21. However, it has been found advantageous to use a four level digital encoding system. The output four level digital data is coupled from video processor 21 to modulator 24 via a precode filter 22. The operation of precode filter 22 is set forth below in greater detail. However, suffice it to note here that precode filter 22 configures the applied four level digital data signal into a form which will be properly interpreted by modulo restorer 51 and modulo decoder 53 despite the introduction of intersymbol interference which occurs in comb filter 50 of receiver 13. In addition, and as is also set forth below in greater detail, precode filter 22 processes the digital data from video processor 20 in accordance with modulo 4 processing which maintains the four level character of the digital signal. The output signal of precode filter 22 is modulated upon a carrier signal produced by carrier source 25 at modulator 24. As mentioned above, the energy of an NTSC co-channel signal is clustered at frequency multiples of its periodicity (e.g. line, field, or frame rates). Thus, to facilitate the use of comb filter 50 to reduce the co-channel interference signal from NTSC co-channel source 14, carrier source 25 is preferably offset from the NTSC carrier frequency by an odd multiple of one-half the NTSC periodicity of comb filter 50. The purpose of this frequency offset is to transmit a signal interleaved with the interfering co-channel signal from NTSC co-channel source 14. This in turn causes the nulls of the comb filter response to generally coincide with the energy clusters of the co-channel signal. Without such a predictable carrier frequency offset, the effectiveness of comb filter 50 in reducing co-channel interference would be reduced in certain cases.

The modulated carrier produced by modulator 24 is coupled via transmission channel 12 to tuner 30 of receiver 13. Simultaneously, the interfering co-channel signal from NTSC co-channel source 14 is also received at tuner 30. In accordance with conventional television receiver processing, tuner 30 converts the received broadcast signals to an intermediate frequency signal which is amplified within intermediate frequency amplifier 31 to an appropriate signal level to drive detector 32. Detector 32 also functions in general accordance with conventional techniques and is operative to recover the modulating signal from the intermediate frequency carrier of intermediate frequency amplifier 31. It should be noted tuner 30, intermediate frequency amplifier 31 and detector 32 are unable to exclude the interfering co-channel signal and thus the output signal at detector output 34 includes the desired precoded four level digital data signal together with the undesired co-channel interference signal which comprises a beat frequency signal between the regenerated high definition carrier signal and the chrominance and video carriers of the interfering NTSC signal. In addition, the output signal of detector 32 includes amplitude reference signals suitable for processing by automatic gain control 33 and horizontal and vertical scan synchronizing signals suitable for processing by synchronizing system 43. Also, the output signal at detector output 34 further includes the clock reference signal incorporated by video processor 21 in transmitter 11. The latter is used by clock recovery system 54 to establish a clock signal corresponding to clock 23 of transmitter 11. A variety of systems may be utilized to produce this clock reference signal without departing from the spirit and scope of the present invention with the essential function being that clock recovery system 54 produces periodic clock signals having frequency and phase correspondence to the clock signals produced by clock 23 within transmitter 11.

As mentioned above, display 40, horizontal scan 41, vertical scan 42 and synchronizing system 43 cooperate in accordance with conventional techniques to produce a scanned raster upon display 40. In accordance with an important aspect of the present invention, the video information provided to display 40 is alternatively processed by comb filter 50 and modulo restorer 51 or directly processed by modulo decoder 53. Switch 52 permits selection of the video information coupled to video processor 36 and thereafter to display 40 from either the output of modulo restorer 51 or modulo decoder 53. In essence, the selection criteria for switch 52 is the presence or absence of an interfering NTSC co-channel source such as source 14. In the event co-channel interference has been introduced into the signal received by receiver 13, switch 52 is set to couple the output of modulo restorer 51 to display 40. In this case, the output signal at detector output 34 is coupled to modulo restorer 51 via a comb filter 50. Comb filter 50 is a conventional real number filter which defines a comb filter response characterized by a plurality of peak periodic responses and interleaved null responses. The peak responses and null responses are preferably, although not necessarily, separated by frequency increments corresponding to the selected NTSC periodicity. It should be recalled that the offset of carrier source 25 from the NTSC carrier frequency described above causes the comb filter null responses of comb filter 50 to generally correspond to the energy distribution or clusters of the interfering co-channel signal. Thus, the output of comb filter 50 is characterized by a substantially reduced amplitude of co-channel interference signal. In addition, it should be noted that comb filter 50 is not a finite field arithmetic processor, but rather is a real number processor. As a result, the output of comb filter 50 is not a four level signal but instead comprises a seven level signal due to the intersymbol interference introduced by the comb filter structure. This seven level signal is processed in accordance with modulo 4 processing by using means set forth below in greater detail within modulo restorer 51 to reconstruct the four level data signal corresponding to the four level data signal produced by video processor 21 in transmitter 11. This four level signal is then further processed to produce a video signal corresponding to the output of video source 20 which is coupled to display 40 by switch 52.

While the operation of comb filter 50 is effective to substantially reduce the co-channel interference signal, the noise performance of receiver 13 is simultaneously degraded. This degradation of noise performance results from the imposition of the comb structure response upon the generally flat frequency spectrum which characterizes noise within broadcast systems. This degradation of noise performance may be willingly tolerated in order to reduce or eliminate co-channel interference because of the far more serious effect upon receiver performance caused by co-channel interference. However, in the event receiver 13 is operated in the absence of an interfering co-channel source, it is highly desirable to avoid this reduction of noise performance. Accordingly, and in accordance with an important aspect of the present invention, in the absence of co-channel interfering signals, switch 52 is set to couple the output of modulo decoder 53 to display 40. The structure of modulo decoder 53 is set forth below in greater detail. However, suffice it to indicate here that decoder 53 performs a finite field arithmetic function complimentary to precoder 22 within transmitter 11. Thus, the four level signal recovered at detector output 34 is processed and decoded by modulo decoder 53 without comb filter 50 to reconstruct the video signal produced by video processor 21 of transmitter 11. This video signal is then processed by processor 36 and displayed by display 40. Because comb filter 50 is not operative in combination with decoder 53, the above described degradation of noise performance is not introduced into the processed signal.

Figure 2:
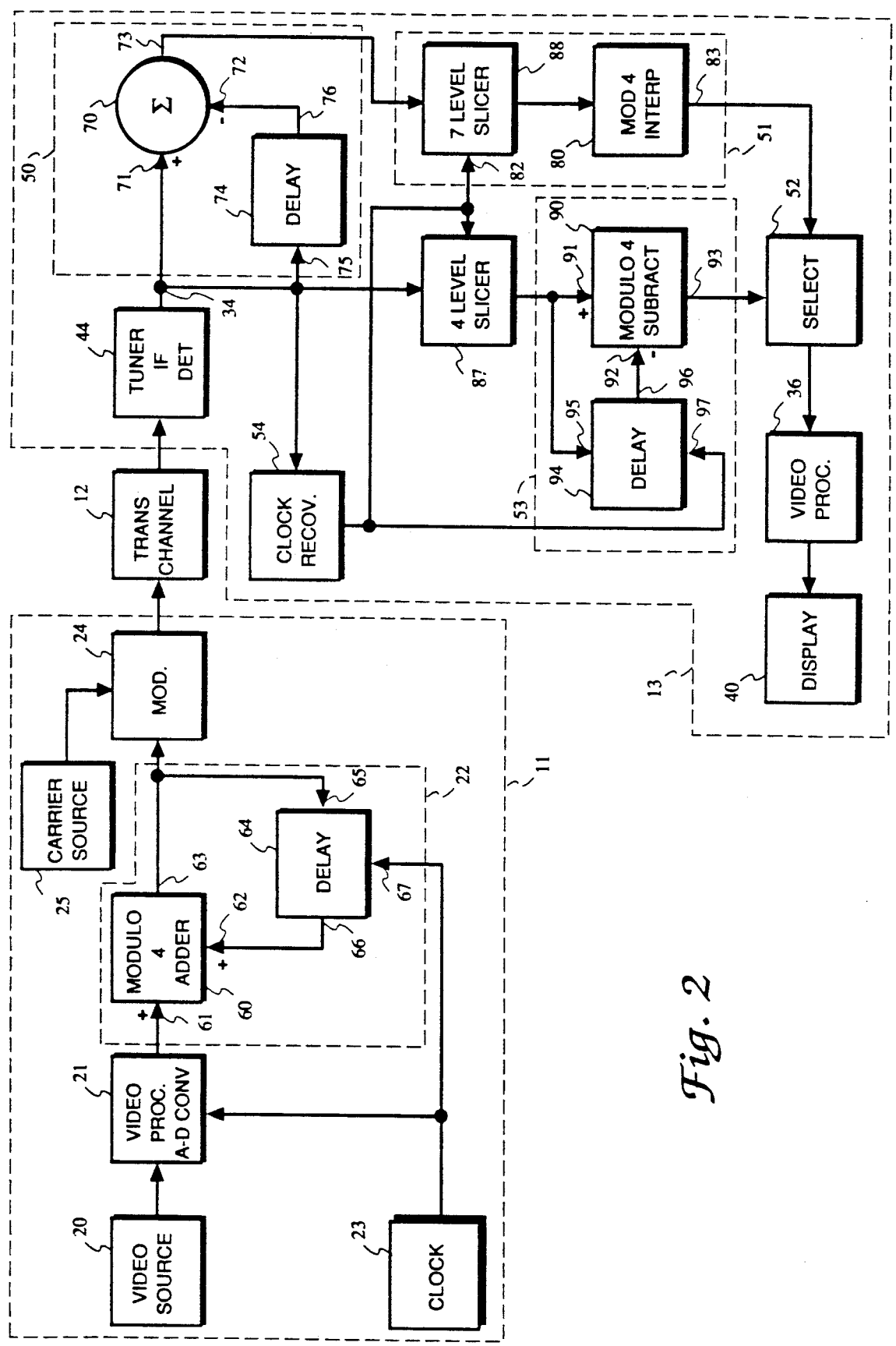
FIG. 2 sets forth a more detailed block diagram of the digital high definition television system of FIG. 1.

FIG. 2 sets forth a block diagram of a portion of system 10 in greater detail. As described above, a transmitter 11 produces a broadcast signal which is coupled by a transmission channel 12 to a high definition television receiver 13. By way of overview, transmitter 11 includes a precode filter 22 having a modulo 4 adder which produces a four level output signal. Correspondingly, receiver 13 includes two parallel processing branches which are selected by switch 52. With switch 52 set to modulo decoder 53, the signal coupled to processor 36 is derived from decoder 53 which includes a complimentary modulo 4 subtracter performing a complimentary operation to the modulo 4 adder of transmitter 11. The function of this modulo 4 subtracter is to simply restore the original four level data signal in situations in which no co-channel interference is present. Alternatively, switch 52 may be set to select restorer 51. The signal path to restorer 51 includes a comb filter 50 for removing co-channel interference. A seven level slicer 88 and a modulo 4 interpreter 80 are operative upon the output of comb filter 50 for recovering and restoring the four level data signal despite the presence of the intersymbol interference signal produced by the comb filter.

Specifically, transmitter 11 includes a video source 20 coupled to a video processor 21. A precode filter 22 couples the output of video processor 21 to a modulator 24. A carrier signal source 25 produces a carrier signal which is coupled to modulator 24. In accordance with the invention, precode filter 22 includes a modulo 4 adder 60 having a positive input 61 coupled to video processor 21, a positive input 62 and an output 63 coupled to modulator 24. A delay circuit 64 has an input 65 coupled to output 63 of modulo 4 adder 60, a clock input 67 coupled to clock 23, and an output 66 coupled to input 62 of modulo 4 adder 60.

Receiver 13 includes a tuner, intermediate frequency amplifier, and detector shown combined in block 44. A comb filter 50 is coupled to detector output 34 and includes a summer network 70 having a positive input 71 coupled to output 34, a negative input 72, and an output 73. A delay circuit 74 has an input 75 coupled to detector output 34 and an output 76 coupled to negative input 72 of summer 70. Summer 70 and delay 74 cooperate to form a comb filter having a response defined by the delay of delay circuit 74. A modulo restorer 51 includes a seven level data slicer 88 coupled to a modulo 4 interpreter 80. A clock input 82 of data slicer 88 is coupled to clock recovery circuit 54.

Receiver 13 further includes a four level data slicer 87 coupled between output 34 and modulo decoder 53. The latter includes a modulo 4 subtracter 90 having a positive input 91 coupled to four level slicer 87, a negative input 92, and an output 93 coupled to switch 52. A delay circuit 94 having a delay corresponding to delay 74 of comb filter 50 includes an input 95 coupled to four level slicer 87, a clock input 97 coupled to clock recovery circuit 54 and an output 96 coupled to negative input 92 of modulo 4 subtracter 90.

In operation, video source 20 produces an analog video signal which is converted by video processor 21 to a compressed four level digital signal which in turn is applied to positive input 61 of modulo 4 adder 60. A delay circuit 64 having a delay equal to delay 74 of comb filter 50 couples the output signal of modulo 4 adder 60 to the remaining positive input 62 of modulo 4 adder 60. Delay 74 of comb filter 50 is preferably selected to correspond to a selected NTSC periodicity. For example, delay 74 may be selected to correspond to the horizontal scan interval of the NTSC co-channel signal. Correspondingly, delay 64 has a delay equal to delay 74 and thus applies an input signal to input 62 of modulo 4 adder 60 which is delayed precisely one horizontal scan interval. It should be noted that obtaining the precise horizontal scan interval delay in delay circuit 64 requires that clock 23 have a frequency which is a multiple of the NTSC horizontal scan frequency. While virtually any multiple can be used, it has been found opportune in the circuit of FIG. 2 to employ a clock frequency for clock 23 equal to three hundred and forty two times the horizontal frequency. The modulo 4 addition of the delayed output signal to the four level digital input signal performed by modulo 4 adder 60 produces a four level output signal which is precoded to permit proper interpretation of the four level signal by modulo 4 interpreter 80 of restorer 51 despite the introduction of intersymbol interference caused by comb filter 50. In addition, the use of modulo 4 adder 60 to precode the transmitted signal provides a saving of transmission power in that conventional precoding operations which include the comb filter at the transmitter produce a seven level output signal which requires greater power for transmission and which would cause increased interference with an NTSC receiver and with no protection against NTSC interference to the high definition television receiver. In any event, the output signal of precode filter 22 is modulated upon a carrier signal produced by carrier source 25 within modulator 24. As described above, carrier source 25 is offset from the NTSC carrier frequency by a frequency increment corresponding to one-half the NTSC periodicity selected for comb filter 50. In the present example, the NTSC periodicity selected for comb filter 50 is the horizontal scan frequency. Thus, carrier source 25 is offset from the NTSC carrier frequency by a frequency difference equal to one-half the horizontal scan frequency or approximately seven and a half khz. Alternatively, carrier source 25 may be offset any odd multiple of one-half the NTSC periodicity and still achieve the desired frequency offset.

The transmitted signal is coupled by transmission channel 12 to receiver 13 within which it is processed by the combination of tuner, intermediate frequency amplifier, and detector within block 44 to produce a detected output signal at detector output 34.

As mentioned above, the signal at detector output 34 may be coupled to display 40 either directly through modulo decoder 53 or through the serial combination of comb filter 50 and modulo restorer 51. To affect this selection, switch 52 is provided. As is also mentioned above, in the event an interfering co-channel signal is present, switch 52 is set to the output of modulo restorer 51 in order to permit comb filter 50 to substantially reduce the co-channel interference signal. Alternatively, in the absence of co-channel interference, switch 42 is set to couple the output of modulo decoder 53 to display 40 which excludes comb filter 50 from the receiver response.

With switch 52 set to modulo restorer 51, the output signal of detector 34 is coupled to the positive input of summer network 70. In addition, the output signal at detector output 34 is delayed one horizontal scan interval and coupled to negative input 72 of summer 70. The combination of the detector output signal and the delayed sample of detector output signal within summer 70 produces a seven level signal within which the co-channel interference signal has been substantially reduced. Thus, the four level input signal has been converted to a seven level output signal as a result of the intersymbol interference produced by the comb filter. The output signal of summer 70 is applied to one input of seven level data slicer 88. The remaining input of data slicer 88 is coupled to clock recovery circuit 54. The output of data slicer 88 is coupled to modulo 4 interpreter 80.

Modulo 4 interpreter 80 performs a modulo 4 arithmetic process upon the input signal and converts the applied seven level signal from summer 70 to a four level digital signal corresponding to the original four level data signal produced by video processor 21. The details of this modulo process are discussed below. However, suffice it to note here that in accordance with the finite field arithmetic characterizing the operation of interpreter 80, all output states of summer 70 correspond to one of the four states of the four level data signal. Thus, the use of a modulo 4 adder within transmitter 11 and a modulo 4 interpreter within receiver 13 permits the reconstruction of the four level data signal produced by video processor 21 despite the intersymbol interference signal caused by comb filter 50.

In the event an interfering co-channel signal is not present, switch 42 may be set to modulo decoder 53 because in the absence of interfering co-channel signals comb filtering is not necessary. In addition, it is desirable to avoid the degradation of receiver noise performance caused by comb filter 50. Thus, with switch 52 set to decoder 53, the output signal at detector 34 is coupled through four level slicer 87 to the positive input of modulo 4 subtracter 90. In addition, the signal at detector output 34 is delayed one horizontal scan interval and applied to negative input 92 of modulo 4 subtracter 90. The combination of delay 94 and modulo 4 subtracter 90 produces an operation which is the compliment of that provided by delay 64 and modulo 4 adder 60 within transmitter 11. Thus, in essence modulo 4 subtracter 90 and delay 94 are operative to reconstruct the output signal of video processor 21 and remove the effects of precode filter 22. This reconstructed signal comprises a four level data signal which is coupled by switch 52 to video processor 36 and thereafter to display 40 as described above.

It will be apparent to those skilled in the art that alternative types of modulo 4 processing may be carried forward in the system of FIG. 2 without departing from the spirit and scope of the present invention. For example, while modulo decoder 53 utilizes a modulo 4 subtracter 90 to combine the delayed and directly coupled signals, an equivalent function may be carried forward by providing modulo 4 addition between the detector output signal and the modulo 4 compliment of the delayed signal. In addition, because the desired cooperation between precode filter 22 and modulo decoder 53 is one in which complimentary functions are performed, the sign relationships between inputs to modulo 4 adder 60 and modulo 4 subtracter 90 may be interchanged. For example, modulo 4 adder 60 may have a positive input at input 61 and a negative input at input 62 while correspondingly modulo 4 subtracter 90 may have a positive input at input 91 and a positive input at input 92. In other words, the functions of adder 60 and subtracter 90 may be switched with the essential feature being their complimentary function to restore the original four level data signal. In addition, the regenerated carrier signal may be shifted in the opposite manner to the offset described above if such functions are interchanged.

It will be further apparent to those skilled in the art that while a modulo 4 processing system has been shown in the embodiment of FIG. 2, other types of modulo arithmetic processing may be used without departing from the spirit and scope of the present invention. The important aspect is that the finite field arithmetic of the modulo type system permits the comb filter output signal, which is produced as the result of real number arithmetic, to be converted to the multi-level data signal.

While the finite field arithmetic used by the modulo 4 processors described above is well known, it is believed that some explanation and illustration thereof will be helpful. Accordingly, FIG. 3 sets forth a convenient diagram which may be used as a visual aid in following the processes of modulo 4 arithmetic. FIG. 4 sets forth a series of data streams to illustrate the modulo 4 processes occurring within the embodiment of FIG. 2.

Figure 3:
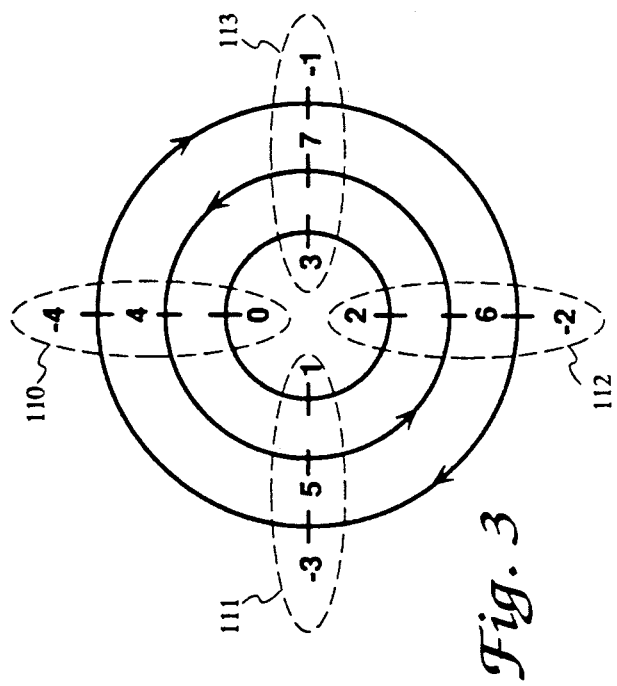
FIG. 3 sets forth a circle diagram aid for analysis of modulo 4 arithmetic.
Figure 4:
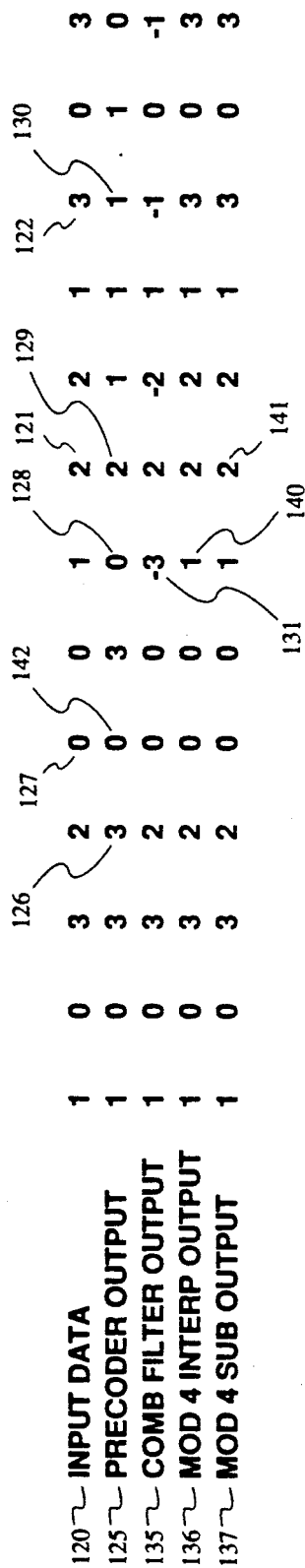
FIG. 4 sets forth a plurality of illustrative data streams for the digital high definition television system of the present invention.

Specifically, with respect to FIG. 3, the center circle is marked with the four numeric values of a four level data system namely: 0, 1, 2, and 3. The next outward circle is marked with the corresponding intermediate values namely: 4, 5, 6, and 7 respectively. The outermost circle is marked with the corresponding negative values namely: $-4$, $-3$, $-2$, and $-1$. The numbers are located or grouped along four resolution axes 110, 111, 112 and 113. The modulo 4 arithmetic resolves each resultant number within each of the four groups 110 through 113 to the corresponding innermost number. Thus, resultants $-4$ or 4 are resolved to the output value 0 while resultant $-3$ and 5 are resolved to the output 1. Similarly, $-1$ and 7 are resolved to output 3 and $-2$ and 6 are resolved to an output 2. Thus, the modulo 4 addition of $3+2$ produces a resultant of 5 which is resolved by the modulo 4 processor to an output 1. Thus, in modulo 4 arithmetic, $3+2=1$ or produces a 1 output.

FIG. 4 sets forth a sample four level data stream 120 which as can be seen comprises various data symbols at each of the four data levels of 0, 1, 2, and 3. Data stream 120 corresponds to the data stream applied to input 61 of modulo 4 adder 60. In the example of FIG. 4, a delay interval of three symbols or three clock signals is used for purposes of illustration. With simultaneous reference to FIGS. 2 and 3 together with FIG. 4, the output of precode filter 22 is represented by a second data stream 125 formed by modulo 4 adding a symbol of stream 120 with a symbol of data stream 125 delayed by three symbol intervals. For example, symbol 129 in data stream 125 results from the modulo 4 addition of symbol 121 of data stream 120 and symbol 142 of data stream 125 ($2+0=2$). Similarly, symbol 130 results from the modulo 4 addition of symbol 122 of data stream 120 and symbol 129 of data stream 125 ($3+2=1$). Data stream 125 is applied to input 71 of summer 70. Comb filter 70, however, is not a modulo 4 processor and thus the output of summer 70 forms data stream 135 which is a seven level data signal in which each symbol is derived by algebraically combining each symbol in data stream 125 with a symbol delayed three symbols therefrom. For example, symbol 131 is derived by subtracting symbol 126 from symbol 128 ($0-3=-3$). Data stream 136 is the resulting output of modulo 4 interpreter 80 in response to data stream 135. For example, symbol 131 of data stream 135 is a −3 which in accordance with FIG. 3 is resolved by modulo 4 interpretation to an output 1 shown in symbol 140. Thus, each symbol within data stream 136 is simply the modulo 4 interpretation of each corresponding symbol within data stream 135. It should be noted that data stream 136 corresponds to the original data stream 120. Data stream 137 which forms the output of modulo 4 subtracter 90 is derived by subtracting each symbol within data stream 125 from the delayed symbol. For example, symbol 141 is derived by subtracting symbol 142 from symbol 129 (2−0=2).

Thus, the original video information is preserved whether the receiver processes the signal through comb filter 50 and modulo restorer 51 to eliminate co-channel interference or processes the video information through decoder 53 in the absence of co-channel interference to maximize noise performance.

What has been shown is a co-channel interference reduction system for digital high definition television which effectively reduces co-channel interference and removes the resulting intersymbol interference signal created by the comb filtering process. The system shown provides for an alternate mode of operation in which the comb filter is removed from the receiver processing in the absence of co-channel interference to maximize receiver noise performance. The use of complimentary modulo processing in the transmitter precoding filter and the receiver maintains the integrity of the digital data information in both modes of operation. The benefits of the invention also apply to the digital portion of a combined analog and digital transmission.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a television system having means for processing digitally encoded signals, a co-channel interference reduction system for reducing the amplitude of an interfering co-channel television signal comprising:
    a television transmitter having signal means for producing digitally encoded signals and a precoding filter for performing a first finite field arithmetic process on said digitally encoded signals to produce precoded digitally encoded signals; and
    a television receiver having means for processing said precoded digitally encoded signals including a filter having a frequency response selected to reduce interfering co-channel television signals and means coupled to said filter for performing a second finite field arithmetic process upon the output of said filter, said second finite field arithmetic process selected to restore said digitally encoded signal.

2. A co-channel interference reduction system as set forth in claim 1 wherein said receiver further includes:
    means performing a third finite field arithmetic process upon said precoded digitally encoded signals to complement said first finite field arithmetic process; and
    switch means for alternatively coupling said digitally encoded signals via either said filter and said means for performing a second finite field arithmetic process or via said means for performing a third finite field arithmetic process.

3. A co-channel interference reduction system as set forth in claim 1 wherein said precoding filter includes:
    a modulo N adder having a first input coupled to said signal means, a second input and a first output; and
    first delay means coupled between said first output and said second input, said first delay means having a delay interval corresponding to the period of a selected periodic signal component of said co-channel television signal.

4. A co-channel interference reduction system as set forth in claim 3 wherein said means for performing a second finite field arithmetic process includes a modulo N interpreter.

5. A co-channel interference reduction system as set forth in claim 4 including means for performing a third finite field arithmetic process upon said precoded digitally encoded signals to compliment said first finite field arithmetic process, comprising:
    a modulo N subtracter having a positive input receiving said precoded digitally encoded signals, a negative input and a second output; and
    second delay means coupled between said positive input and said negative input, said second delay means having a delay interval equal to that of said first delay means.

6. A co-channel interference reduction system as set forth in claim 5 including switch means for alternatively coupling said digitally encoded signals via either said filter and said means for performing a second finite field arithmetic process or via said means for performing a third finite field arithmetic process.

7. A co-channel interference reduction system as set forth in claim 6 wherein said filter includes:
    a summer having a positive input receiving said precoded digitally encoded signals, a negative input, and a summer output coupled to said second finite field processor; and
    third delay means having a delay interval equal to that of said first delay means coupled between said positive input and said negative input.

8. A co-channel interference reduction system as set forth in claim 7 wherein N is equal to four.

9. A co-channel interference reduction system as set forth in claim 1 wherein said precoding filter includes:
    a modulo N subtracter having a first input coupled to said signal means, a second input and a first output; and
    first delay means coupled between said first output and said second input, said first delay means having a delay interval corresponding to the period of a selected periodic signal component of said co-channel television signal.

10. A co-channel interference reduction system as set forth in claim 9 wherein said means for performing a second finite field arithmetic process includes a modulo N interpreter.

11. For use in a television system having means for processing digitally encoded signals and for transmitting said processed digitally encoded signals over a selected television channel, a co-channel interference reduction system for reducing the amplitude of an interfering co-channel television signal having a plurality of periodic signal components therein, said co-channel interference reduction system comprising:
    television transmitter signal means for producing digitally encoded signals and a precoding filter for performing a first finite field arithmetic process on said digitally encoded signals to produce precoded digitally encoded signals;

means for transmitting said precoded digitally encoded signals using a carrier signal having a frequency offset from the co-channel interfering signal; and a television receiver having means for receiving and processing said transmitted precoded digitally encoded signals including a receiver filter having a frequency response selected to reduce interfering co-channel television signals and a second finite field processor coupled to said receiver filter performing a second finite field arithmetic process upon the output of said receiver filter, said second finite field arithmetic process selected to restore said digitally encoded signals.

12. A co-channel interference reduction system as set forth in claim 11 wherein the filter frequency response has a periodicity corresponding to a selected one of the periodic signal components of the co-channel signal and wherein the frequency offset of said carrier signal is equal to an odd multiple of one half the frequency of the selected one of the periodic signals.

13. A co-channel interference reduction system as set forth in claim 12 wherein said receiver further includes:

a third finite field processor performing a third finite field arithmetic process upon said precoded digitally encoded signals to compliment said first finite field arithmetic process; and switch means for alternatively coupling said precoded digitally encoded signals via either said filter and said second finite field processor or via said third finite field processor.

14. A co-channel interference reduction system as set forth in claim 13 wherein said precoding filter includes:

a modulo N adder having a first input coupled to said signal means, a second input and a first output; and first delay means coupled between said first output and said second input, said first delay means having a delay interval corresponding to the period of a selected one of said plurality of periodic signal components.

15. A co-channel interference reduction system as set forth in claim 14 wherein said second finite field processor includes a modulo N interpreter.

16. A co-channel interference reduction system as set forth in claim 15 wherein said third finite field processor includes:

a modulo N subtracter having a positive input receiving said precoded digitally encoded signals, a negative input and a second output; and second delay means coupled between said positive input and said negative input, said second delay means having a delay interval equal to that of said first delay means.

17. A co-channel interference reduction system as set forth in claim 16 wherein said filter includes:

a summer having a positive input receiving said precoded digitally encoded signals, a negative input, and a summer output coupled to said second finite field processor; and third delay means having a delay interval equal to that of said first delay means coupled between said positive input and said negative input.

18. A co-channel interference reduction system as set forth in claim 17 wherein N is equal to four.

19. A co-channel interference reduction system as set forth in claim 12 wherein said precoding filter includes:

a modulo N subtracter having a first input coupled to said signal means, a second input and a first output; and first delay means coupled between said first output and said second input, said first delay means having a delay interval corresponding to the period of a selected one of said plurality of periodic signal components.

20. A co-channel interference reduction system as set forth in claim 19 wherein said second finite field processor includes a modulo N interpreter.

21. For use in a television system having means for processing digitally encoded signals, a method of reducing the amplitude of an interfering co-channel television signal having a plurality of periodic signal components therein, said method of reducing the amplitude of co-channel interference signals comprising the steps of:

producing digitally encoded television signals;

performing a first finite field arithmetic process on said digitally encoded television signals to produce precoded digitally encoded signals;

transmitting said precoded digitally encoded signals over a selected television channel;

receiving said transmitted precoded digitally encoded signals; and processing said received digitally encoded signals using a filter having a frequency response selected to reduce interfering co-channel television signals and performing a second finite field arithmetic process upon said precoded digitally encoded signals after said step of processing, said second finite field arithmetic process selected to restore said precoded digitally encoded signals to said digitally encoded signal.

22. A method of reducing the amplitude of co-channel interference signals as set forth in claim 21 wherein said transmitting step includes modulating a television channel carrier which has a frequency offset from the carrier frequency of said interfering co-channel television signal.

23. The method of reducing the amplitude of co-channel interference signals as set forth in claim 22 wherein the co-channel interfering signal exhibits a periodicity and wherein the frequency of said television channel carrier is offset from the frequency of said interfering co-channel television signal by an amount equal to an odd multiple of one half the frequency of said periodicity.

24. For use in a television system processing digitally encoded signals in which a television transmitter includes signal means for producing digitally encoded signals and a precoding filter for performing a first finite field arithmetic process on the digitally encoded signals to produce precoded digitally encoded signals, a television receiver comprising:

means for processing said precoded digitally encoded signals including a filter having a frequency response selected to reduce interfering co-channel television signals and means coupled to said filter for performing a second finite field arithmetic process upon the output of said filter, said second finite field arithmetic process selected to restore said digitally encoded signal.

25. A co-channel interference reduction system as set forth in claim 24 further including:

means performing a third finite field arithmetic process upon said precoded digitally encoded signals to complement said first finite field arithmetic process; and switch means for alternatively coupling said digitally encoded signals via either said filter and said means for performing a second finite field arithmetic process or via said means for performing a third finite field arithmetic process.

26. For use in a television system having means for processing digitally encoded signals, a co-channel interference reduction system for reducing the amplitude of an interfering co-channel television signal comprising:

a television transmitter having signal means for producing digitally encoded signals and a precoding filter for performing a first finite field arithmetic process on said digitally encoded signals to produce precoded digitally encoded signals;

a television receiver having means for processing said precoded digitally encoded signals including a filter having a frequency response selected to reduce interfering co-channel television signals and means coupled to said filter for performing a second finite field arithmetic process upon the output of said filter, said second finite field arithmetic process selected to restore said digitally encoded signal;

means performing a third finite field arithmetic process upon said precoded digitally encoded signals to complement said first finite field arithmetic process; and switch means for alternatively coupling said digitally encoded signals via either said filter and said means for performing a second finite field arithmetic process or via said means for performing a third finite field arithmetic process.

27. For use in a television system processing digitally encoded signals in which a television transmitter includes signal means for producing digitally encoded signals and a precoding filter for performing a first finite field arithmetic process on the digitally encoded signals to produce precoded digitally encoded signals, a television receiver comprising:

means for processing said precoded digitally encoded signals including a filter having a frequency response selected to reduce interfering co-channel television signals and means coupled to said filter for performing a second finite field arithmetic process upon the output of said filter, said second finite field arithmetic process selected to restore said digitally encoded signal;

means performing a third finite field arithmetic process upon said precoded digitally encoded signals to complement said first finite field arithmetic process; and switch means for alternatively coupling said digitally encoded signals via either said filter and said means for performing a second finite field arithmetic process or via said means for performing a third finite field arithmetic process.

28. A television system having reduced susceptibility to interfering co-channel television signals comprising:

a television transmitter having signal means for producing an N level digitally encoded signal and a modulo N precoder for precoding said N level digitally encoded signal to produce an N level precoded digitally encoded signal; and a television receiver comprising a filter having a frequency response selected for reducing interfering co-channel television signals and for producing an M level output signal in response to said N level precoded digitally encoded signal, where M is greater than N, and means for converting said M level output signal to said N level digitally encoded signal.

29. A television system as set forth in claim 28 wherein said receiver further includes:

a modulo N decoder comprising the complement of said modulo N precoder for producing an N level output signal in response to said precoded digitally encoded signal corresponding to said N level digitally encoded signal; and switch means for alternatively coupling the N level output signal from either said means for converting or said modulo N decoder.

30. A television system as set forth in claim 29 wherein said modulo N precoder comprises a feedback circuit and wherein said filter and said modulo N decoder comprise respective feed forward circuits.

31. A television signal receiver having reduced susceptibility to interfering co-channel television signals comprising:

means for receiving an N level precoded signal representing an N level digitally encoded video data signal;

filter means having a frequency response selected for reducing interfering co-channel television signals and for producing an M level output signal in response to said received precoded signal, where M is greater than N; and means for converting said M level output signal to said N level digitally encoded video data signal.

32. A television signal receiver as set forth in claim 31 including:

a decoder for producing an N level output signal in response to said received precoded signal corresponding to said N level digitally encoded video data signal; and switch means for alternatively coupling the N level output signal from either said means for converting or said decoder.

* * * * *